Feb. 28, 1939.     H. N. OTT     2,148,576
MICROSCOPE
Original Filed Jan. 4, 1935    3 Sheets-Sheet 1

INVENTOR.
Harvey N. Ott
By Parker, Prochnow & Farmer.
ATTORNEYS.

Feb. 28, 1939. H. N. OTT 2,148,576
MICROSCOPE
Original Filed Jan. 4, 1935 3 Sheets-Sheet 2
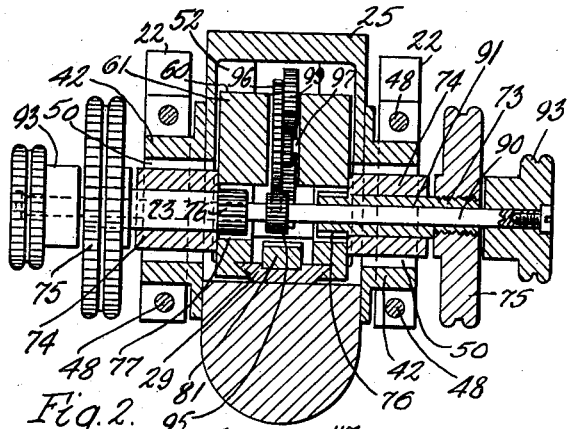
Fig. 2.
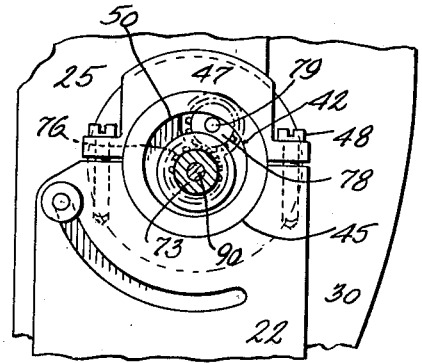
Fig. 3.
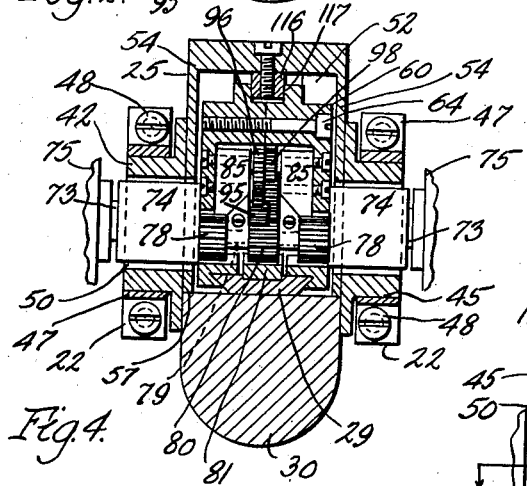
Fig. 4.
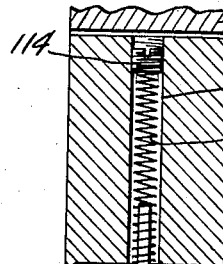
Fig. 5.
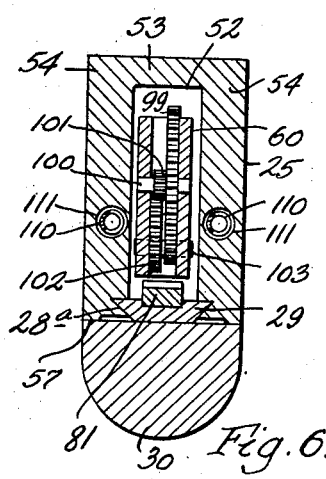
Fig. 6.
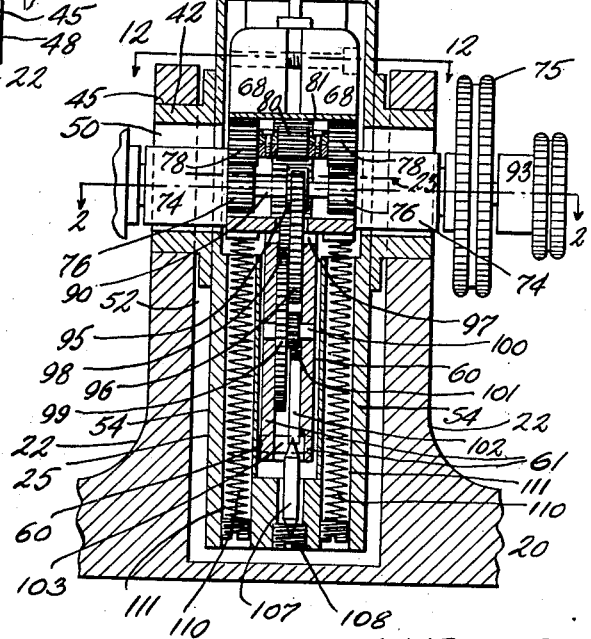
INVENTOR.
Harvey N. Ott
By
Parker, Prochnow & Farmer.
ATTORNEYS.

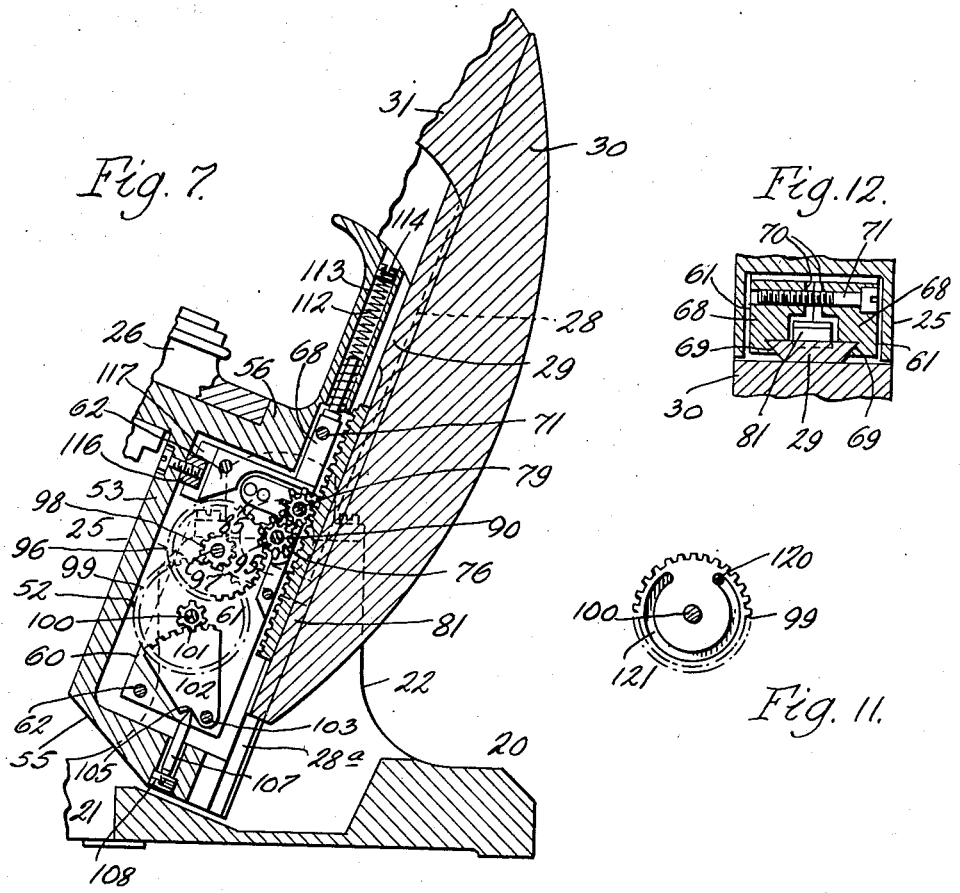
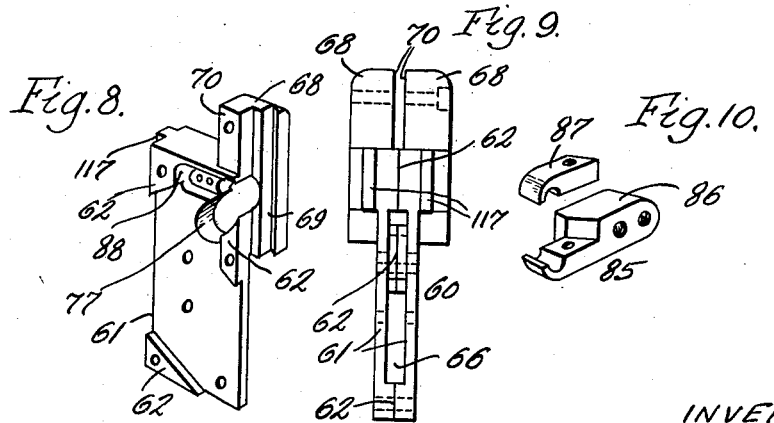

Patented Feb. 28, 1939

2,148,576

UNITED STATES PATENT OFFICE 2,148,576

MICROSCOPE

Harvey N. Ott, Buffalo, N. Y., assignor to Spencer Lens Company, Buffalo, N. Y.

Original application January 4, 1935, Serial No. 423. Divided and this application February 20, 1937, Serial No. 126,871

4 Claims. (Cl. 88—39)

This invention relates to improvements in microscopes.

It is desirable in microscopes having coarse and fine adjusting mechanisms to locate the operating knobs for such mechanisms near the lower part or base so as to make the manipulation of the knobs as convenient as possible, and so that the hands of the user of the microscope can rest upon the surface upon which the latter rests, to the end that the further advantage of steadiness is ensured while making the adjustments.

It is an object of the present invention to provide a microscope in which the above advantages are attained in a novel and practical manner; in which the knobs for both coarse and fine adjusting mechanisms are disposed in approximately the same position and upon a common axis so that the usual bothersome and annoying groping about from one knob or set of knobs to another knob or set of knobs, while observations are being made through the eyepiece of the instrument, is eliminated.

The type of microscope referred to usually includes a stationary base and an upright arm upon which is mounted the optical system in position to be supported over the stage of the instrument. This supporting arm is movably connected to the base by a transverse, horizontal pivot or inclination joint to enable the arm and the optical system to be tilted relatively to the base in a direction towards and from the user.

It is a further object of the invention to construct a microscope in which the common axis of the operating knobs for the adjusting mechanisms of the instrument is disposed approximately coincident with or upon the axis of the inclination joint so that these knobs may be found in the same position regardless of the degree to which the arm is tilted about said joint; in which an inclination joint is provided with which the last mentioned arrangement may be effected and the adjusting knobs rendered accessible in a practical and advantageous manner; in which the coarse and fine adjusting mechanisms for shifting the arm to vary the position of the optical system or parts thereof relatively to the base are constructed and are operatively connected to said arm in an improved and practical manner such as to assure smooth and accurate adjustments to be made under all conditions of use, and in which the adjusting mechanisms are of relatively inexpensive and durable construction so as to give long life with the minimum attention for repair or replacement of parts.

Various other objects and advantages will be apparent from the following disclosure of an embodiment of the invention, and the novel features thereof will be pointed out in the appended claims.

In the accompanying drawings:

Fig. 2 is a horizontal section of the coarse and fine adjusting mechanisms of the instrument on an enlarged scale, taken approximately on the line 2—2, Fig. 1.

Fig. 3 is a fragmentary, side elevation, partly in section, of the inclination joint and associated parts of the microscope.

Fig. 4 is a fragmentary, horizontal section of the coarse and fine adjusting mechanisms taken approximately on line 4—4, Fig. 1.

Fig. 5 is a transverse, vertical section of a part of the instrument taken approximately on the line 5—5, Fig. 1.

Fig. 6 is a horizontal section thereof on line 6—6, Fig. 1.

Fig. 7 is a fragmentary, vertical section showing the lower portion of the instrument in approximately the same plane as that shown in Fig. 1, but with the parts in a different position.

Fig. 8 is a perspective view of a plate forming part of the adjusting mechanism of the microscope.

Fig. 9 is an edge view, partly broken away, of a pair of such plates arranged in operative relation to each other, but detached from the instrument.

Fig. 10 is a perspective view showing detached, two separated portions of a bearing for a shaft of the microscope adjusting mechanism.

Fig. 11 is a fragmentary, sectional elevation, showing a limiting stop for the fine adjusting mechanism of the microscope.

Fig. 12 is a fragmentary, horizontal section thereof on line 12—12, Fig. 5.

Figure 1:
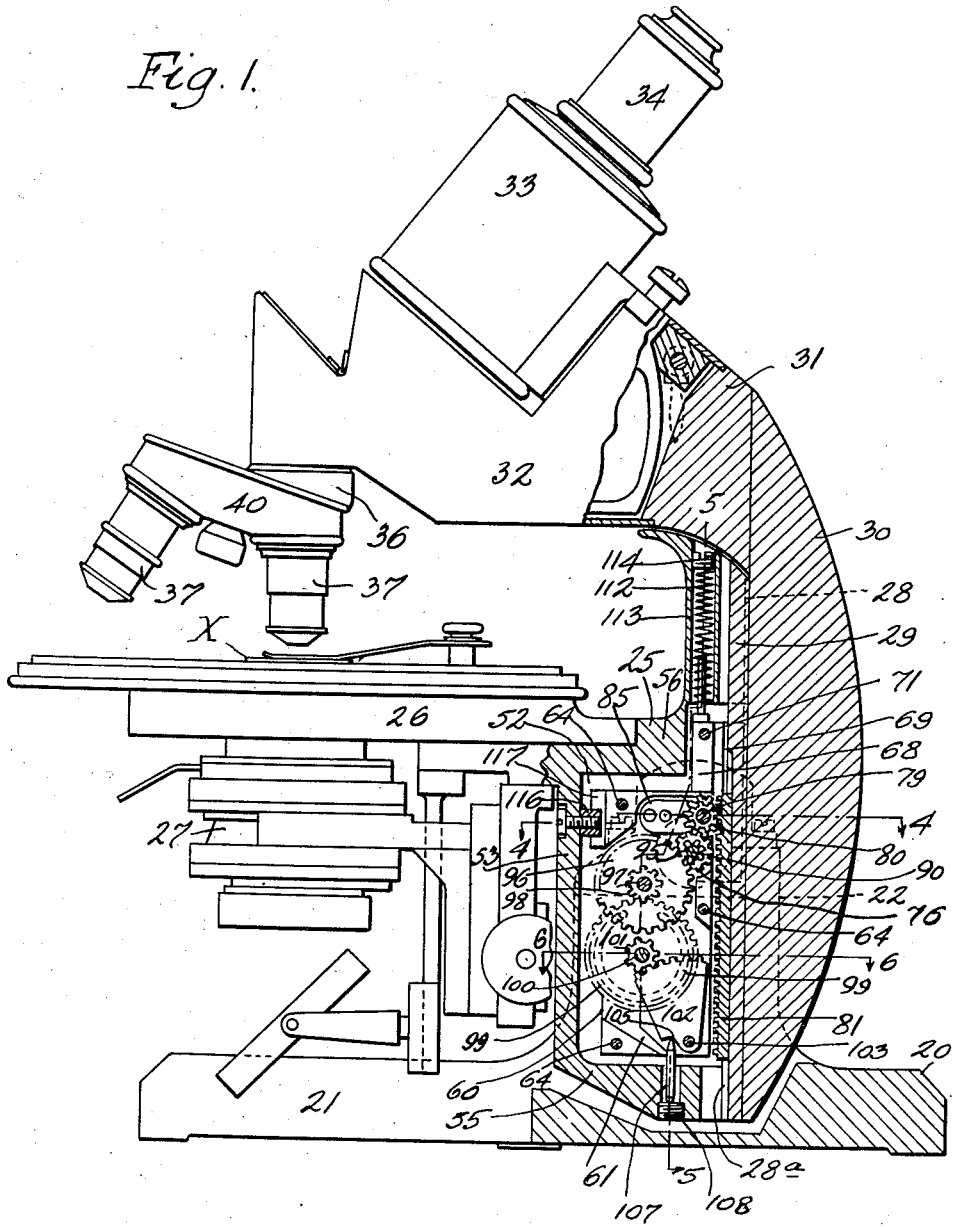
Fig. 1 is a side elevation, partly in section, of a microscope illustrative of this invention.

The microscope shown in the drawings for illustrating the invention is of the compound type, and comprises in general, a stand or support 20 provided with a foot 21 of conventional horseshoe formation and from which there projects upwardly a pair of posts 22. Journalled upon and between these posts 22 for swinging movement about the transverse horizontal axis 23 of an inclination joint is an intermediate member or support 25 on which is mounted a stage 26 for the specimen or object X to be examined, and below which may be arranged a condenser 27 supported upon the intermediate member 25 for movement toward and from the stage by an adjustable sliding connection. The parts 26—27 just described are of the conventional sort employed upon microscopes and form no part of the present invention.

The intermediate supporting member 25 is provided at the rear thereof with upper and lower pairs of opposed upright guide grooves 28 and 28a respectively within which is slidably arranged a dovetail or bar 29 rigidly secured to the front face of an upright arm 30. At the upper end of said arm 30 there is detachably secured a bracket 31 supporting a forwardly extending housing 32 disposed above the stage 26. A body member 33 carrying an eyepiece or occular system 34 of any usual or suitable construction is in turn movably mounted at the upper part of the housing 32. As will be seen upon reference to Fig. 1, this body tube 33, together with its eyepiece 34 is adjustable from a position in which the axis of the eyepiece extends vertically to a position in which the axis of the eyepiece is tilted rearwardly or in a direction towards the user of the instrument.

At the lower forward end of the housing 32, below the body tube 33, there is provided a lens tube 36 having at its lower end a relatively fixed objective 37.

The pivotal connection or inclination joint between the support 25 and the spaced upright posts 22 comprises a pair of oppositely extending trunnions 42 projecting from opposite side faces of the member 25. These trunnions 42 engage in circular bearing holes or apertures 45 formed in part in the upper ends of the uprights 22 and in part in bearing caps or members 47 which are adjustably secured to the upper ends of the uprights by screws or devices 48 in a manner to apply a gripping or frictional action upon the outer circular faces of the trunnions 42. By proper adjustment of the screws 48, sufficient pressure can be applied to the trunnions to permit the arm 30 and the optical system carried thereupon to be swung about the axis of the trunnions and be retained in any inclined position desired by the user of the instrument. As shown in the drawings the trunnions are made hollow, or are in the form of sleeves having concentric alined openings 50 extending in a transverse direction upon the axis 23.

In the present invention I have provided coarse and fine adjusting mechanisms of novel construction for shifting the arm 30 and parts supported thereon relatively to the base 20, wherein revoluble operating members for said mechanisms are arranged horizontally upon a common axis and this axis, in turn, closely approximates the axis 23 of the above described inclination joint.

In the intermediate supporting member 25, there is formed a recess or cavity 52 which is bounded by a front, upright wall 53, upright, parallel side walls 54, a transverse bottom wall 55, and a similar top wall 56. The recess 52 is open at the rear, upright face 57 of said member 25.

Within said recess 52 and in spaced relation to the walls thereof is arranged a block or member 60 upon which the various parts of the coarse and fine adjusting mechanism are mounted. This member or block is formed of two similar, upright, substantially parallel plates 61, one of which is shown in perspective in Fig. 8. These plates 61 are of right and left hand form and are provided with opposed, spaced lugs 62 having vertical faces which abut when the plates are assembled, as shown in Fig. 6. The two plates are secured in this relation by suitable screws or fastening devices 64 engaging in horizontal alined holes in the two plates. When the plates are assembled, there is formed between them a narrow, upright pocket 66, the purpose of which will be later described.

Each of the plates 61, see Figs. 8 and 9, is provided with an upper extension 68 in which is formed an upright dovetail guide or groove 69. The two guides together fit or embrace the opposite bevelled edges of the aforementioned dovetail 29 of the arm 30. The extensions 68 have their opposed inner faces 70 in spaced relation.

A horizontal, transversely arranged screw 71, see Figs. 1, 5 and 12, engaging in alined holes in said extensions enables these extensions to be drawn toward each other and the guides 69 forced into firm gripping contact with the dovetail 29 of the arm 30. It is intended that when effecting a coarse adjustment of the arm 30 and objective 37, the arm, through its sliding connection with the member 25 will shift up and down relatively thereto and also relatively to the guides 69 of the member 60.

When making fine adjustments of the arm 30 and objective 37, however, the movement of the arm up and down is effected through a corresponding up and down movement of the member 60 which, at this time, maintains its relation to or position upon the dovetail 29 through the guides 69 so that the member 60, together with the coarse and fine adjusting mechanisms thereon and the arm 30, will all move together as a unit.

The coarse adjusting mechanism shown in the drawings comprises a pair of horizontal, alined revoluble sleeves or adjusting members 73 which are journalled in axially alined, oppositely extending lateral bearings 74, one of which is formed on or secured to each of said plates 61 and projects through and in spaced relation to said holes 50 in the trunnions 42 of the inclination joint. At their outer ends each of said sleeves is provided with an adjusting knob or actuating member 75 by which it may be rotated in its bearing, and at its inner end each sleeve has a pinion 76 positioned in a hole 77 in the plates 61 upon which it is supported. Each of these pinions 76 is arranged to mesh with corresponding pinions 78 secured upon opposite ends of a horizontal jack shaft 79 suitably journalled at the upper end of the member 60. Fixed upon the jack shaft 79 between and in spaced relation to the pinions 78 is another pinion 80 which meshes with an upright rack bar 81 fixed to the front face of the dovetail 29 of the arm 30. Upon rotation of either one of the sleeves 73, therefore, the jack shaft will be turned and its pinion 80, by engagement with said rack, will shift the arm 30 up and down, depending upon the direction of rotation of the knob 75 of that sleeve 73 which was rotated.

The jack shaft 79 may be rotatably mounted upon the block 60 in any suitable way. As shown in the drawings, I provide a pair of bearings 85, each of which comprises a block 86 and a cap 87, see Figs. 1, 5 and 10. The blocks 86 have lateral parts formed to fit in appropriate recesses 88 in the plates 61 where they are rigidly secured by means of screws passing through registering holes in said plates and blocks. Each block 86 and cap 87 is formed with registering half round, transverse, horizontal grooves which, when a cap 87 is placed into operative relation with its companion block 86, forms a bearing hole for a part of the jack shaft 79. The caps 87 are secured to the respective blocks by screws passing through registering holes in the two parts, and the grooved portion of each block 86 and cooperating cap 87 is of such transverse width as to fit between an end pinion 78 and the central pinion 80 of the jack shaft. The outer faces of the pinions 78 are disposed close to the transverse upright faces of the bearing sleeves 74, whereby the jack shaft and its pinions are held against endwise movement while free rotation thereof is permitted.

The fine adjusting mechanism for the arm 30 and its optical system includes a transverse, horizontal shaft 90 which rotatably fits in axially alined, longitudinal holes 91 in the two sleeves 73 of the coarse adjustment mechanism, said shaft being provided at each of its ends, and outwardly beyond the coarse adjusting knobs 75, with adjusting knobs or members 93 for rotating it. On that intermediate portion of said shaft 90 which is exposed between the two pinions 76 of the sleeves 73, there is fixed a pinion 95 which meshes with a gear 96 arranged in the pocket 66 between the two plates 61 of the member 60. This gear 96 is fixed upon a short horizontal shaft 97 journalled in holes in the two plates 61. Also fixed upon said shaft 97 alongside the gear 96, is a pinion 98 which, in turn, meshes with a gear 99 fixed upon a second horizontal shaft 100 similarly mounted. This shaft 100 also has fixed thereupon a pinion 101 which is arranged to mesh with the teeth of a gear sector 102 fixed upon another horizontal shaft or pivot 103. The pivot or shaft 103 is also journaled in holes in said plates 61, and said gear 99, pinion 101 and sector 102 are also confined in the pocket 66 between said plates.

The pivot 103 is disposed near the lower end of the member 60, and its sector 102 is provided with a downwardly facing shoulder or notch 105 into the angle or bottom of which there extends the upper pointed end of an abutment or fulcrum member 107 in the form of a substantially vertical pin, the lower end of which is also pointed and is received upon a conical seat in a screw plug 108 secured in the bottom wall 55 of the recess 52. The fulcrum member or abutment 107 therefore comprises the support upon which the member 60 rests.

The member 60 is shown in Fig. 1 in approximately its lowest position, while in Fig. 7, approximately the extreme upper position to which it can be shifted is illustrated. The movement between these two positions constitutes the necessary range of movement for effecting fine adjustments of the arm 30 and its objective 37.

In the position shown in Fig. 1, the horizontal axis of the pivot 103 is somewhat below the upper pointed end of the abutment 107. Assuming the parts to be in the position shown in Fig. 1, an appropriate rotation of the shaft 90 of the fine adjusting mechanism will, through the pinion 95, gear 96, pinion 97, gear 99 and pinion 101, cause the sector 102 to move about its pivot towards the position of the sector shown in Fig. 12. In this movement, due to the reaction of the abutment 107 against the sector, the pivot 103 will be caused to move upwardly about the upper end of said abutment, carrying with it the member 60, together with all of the parts of the fine adjusting mechanism mounted thereon, and also the operating members of the fine and coarse adjusting mechanism. Also during such movement of the member 60, by reason of its gripping engagement with the dovetail 29, as described the arm 30 will be carried with the member 60 without moving relatively thereto, as a unit, the coarse adjustment operating means, including the pinion 80, remaining idle. This action is possible through the frictional resistance between the various gears and pinions of the train.

To overcome or counterbalance to some extent the dead weight of the arm 30 and the parts mounted thereon, together with that of the member 60, I arrange a pair of compression coil springs 110 in suitable vertical holes 111 in the intermediate member 25 with their lower ends engaging the bottom walls of said holes which, if desired, may be formed in the form of screw plugs, and the upper ends of the springs abutting against the bottom transverse faces of the extension 68 of the block or unit 60. While the action of these springs 110 is such as to tend to lift the parts mentioned relatively to the fixed abutment 107, I provide an additional opposing tension coil spring 112 which is arranged in a hole 113 in the upper part of the intermediate member 25 in a position to react against a screw plug 114 at the upper end of said hole and the adjacent upper portions of the two extensions 68 of the member 60. The above described resilient means cooperate to overcome any tendency of the parts to stick in their guides and assists in maintaining the sector 102 at all times in proper engagement with its abutment 107.

I provide on the inner face of the upright wall 53 of the recess 52 a guide block 116 against which opposed vertical faces 117 upon the two plates 61 slidably engage for preventing lateral displacement of the member 60 relatively to the member 25 and to assist it in its up and down movements.

I provide also suitable stop means for limiting the throw of the sector 102 and the resulting up and down movements of the member 60 and the parts adjusted thereby. These means, in the construction illustrated, comprises a pin 120 which is fixed to the inner face of one of the plates 61 so as to extend into an annular groove 121 with closed ends formed in the adjacent face of the gear wheel 99 concentric with its axis. In one extreme position of the member 60, one end of the groove 121 will strike the pin 120, and in the rotation of said gear during the shifting of the member 60 to its other extreme position in effecting fine adjustment, the other end of the groove 121 will strike said pin 120. Any other suitable limit stop construction may be used for the purpose stated.

The above described arrangement provides a very practical and compact structure wherein the coarse and fine adjusting mechanisms, while being entirely enclosed in the recess 52, can nevertheless be completely assembled as a unit upon the block 60 and the assembly placed into position through the open, rear end of said recess 52 before the arm 30 is placed into position. Then, as the dovetail 28 of the arm is engaged in its guides 28a it passes through the guideways 69 of the block 60. By then turning the screw 71, the guides 69 can be clamped upon the dovetail with the required pressure to effect the proper operative connection between the arm 30 and the fine adjusting mechanism.

Also, since the operating members or wheels 75 and 93 of the coarse and fine adjusting mechanisms respectively are arranged concentrically upon the axis of the shaft 90 which axis, in turn, is approximately coincident with the axis 23 of the inclination joint, the operating knobs 75 and 93 may be readily located without groping around, while observations are being made through the eyepiece of the instrument, regardless of the angular position of the arm 30 relatively to the base when the arm is tilted about its inclination joint.

It is, of course, to be understood that the shaft 90 of the fine adjustment mechanism will rotate without any movement of the sleeves 74 of the coarse adjustment mechanism, and vice versa.

Furthermore, it will be obvious that since the trunnions 42 of said inclination joint are of relatively large diameter in order to permit the passage of the sleeves 74 therethrough, large and firm bearings are provided for rotatably supporting the movable arm 30 and the parts mounted thereon. The arrangement described also provides relatively long, sturdy, alined bearings for the adjusting members of the coarse and fine adjusting mechanisms.

This case is a division of my copending application for Letters Patent for improvements in microscopes, filed January 4, 1935 and bearing Serial Number 423.

I claim as my invention:

1. In a microscope, a primary supporting member, an intermediate supporting member, an arm movably mounted upon said intermediate supporting member, an optical system supported by said arm, one of said members having relatively large diameter, hollow trunnions journalled in the other member to provide an inclination joint whereby said intermediate supporting member and said arm together with said optical system may be tilted relatively to and on said primary supporting member, adjusting mechanism for shifting said arm relatively to said intermediate supporting member to effect adjustments of said optical system, said adjusting mechanism including a third member which is movable relatively to said other two members, and revoluble operating means mounted upon said third member and extending through said large diameter hollow trunnions to afford access for rotating the same, and said means being rotatable about an axis approximately coincident with the pivotal axis of said inclination joint, and said operating means when actuated, being movable to shift the axis thereof in and relatively to said hollow trunnions in a direction transverse to the axis of said trunnions.

2. In a microscope, an arm upon which an optical system is supported, a supporting member upon which said arm is slidably mounted, a movable block mounted in said supporting member and having parts gripping said arm to effect movement thereof by and upon movement of said block, adjusting mechanism on said block also operatively engaging said arm for shifting the same relatively to said supporting member and said block, said last mentioned adjusting mechanism including a bearing on said movable block, and operating means for said adjusting mechanism rotatably journalled in said bearing, and movable with said block and said bearing and relatively to said supporting member when actuated to adjust said arm.

3. In a microscope, a primary supporting member, an intermediate supporting member, an arm movably mounted upon said intermediate supporting member, an optical system supported by said arm, one of said members having alined trunnions provided with relatively large diameter bores, said trunnions being journalled in the other member to provide an inclination joint whereby said intermediate supporting member and said arm together with said optical system may be tilted relatively to said primary supporting member, a block movably mounted in a cavity in said intermediate supporting member, coarse and fine adjusting mechanisms mounted on said block for adjusting said arm relatively to said intermediate supporting member to effect primary and secondary adjustments of said optical system, parts on said block engageable with said arm to shift the latter with said block upon and by movement of said block in effecting one of said adjustments of said arm separate revoluble operating members for separately actuating each of said adjusting mechanisms journalled in said block and extending through the bores of said hollow trunnions in out of contact relation thereto and parallel with the axis thereof with the ends of said operating members projecting beyond the ends of said hollow trunnions to afford access for manipulation, and said operating members being together movable within said bores of and relatively to said trunnions and with said block in a direction perpendicular to and parallel with their axes and the axis of said inclination joint in effecting one of said adjustments of said arm.

4. In a microscope, an arm upon which an optical system is supported, a supporting member upon which said arm is slidably mounted, a movable block disposed in a cavity in said supporting member, a pair of aligned bearings arranged one on each side of said block, separately rotatable, axially aligned sleeves journalled one in each of said bearings and extending into said block, spaced racks on said arm, a pinion on each of said spaced sleeves, and gearing operatively connecting said sleeves with said racks, so that upon rotation of either of said sleeves, said arm may be shifted relatively to said supporting member and said block to effect an adjustment of said optical system, a shaft journalled in said sleeves and extending through said block, parts on said block engaging said arm for moving said arm by and upon movement of said block, and block shifting means including gearing interposed between said shaft and said block for shifting said block upon rotation of said shaft to transmit movement to said arm for effecting a different adjustment of said optical system.

HARVEY N. OTT.